(12) United States Patent
Armbruster

(10) Patent No.: US 11,826,929 B2
(45) Date of Patent: Nov. 28, 2023

(54) INJECTION MOULD FOR PRODUCING COMPLEX MOULDED PARTS FROM PLASTIC

(71) Applicant: FOBOHA (GERMANY) GMBH, Haslach (DE)

(72) Inventor: Rainer Armbruster, Wolfach (DE)

(73) Assignee: FOBOHA (GERMANY) GMBH, Haslach (DE)

( * ) Notice: Subject to any disclaimer, the term of this patent is extended or adjusted under 35 U.S.C. 154(b) by 0 days.

(21) Appl. No.: 16/964,407

(22) PCT Filed: Nov. 16, 2018

(86) PCT No.: PCT/EP2018/081606
§ 371 (c)(1),
(2) Date: Jul. 23, 2020

(87) PCT Pub. No.: WO2019/145063
PCT Pub. Date: Aug. 1, 2019

(65) Prior Publication Data
US 2021/0046682 A1 Feb. 18, 2021

(30) Foreign Application Priority Data
Jan. 23, 2018 (CH) ...................................... 0079/18

(51) Int. Cl.
*B29C 45/33* (2006.01)
*B29C 45/44* (2006.01)
*B29L 31/54* (2006.01)

(52) U.S. Cl.
CPC ........ *B29C 45/332* (2013.01); *B29C 45/4421* (2013.01); *B29C 2045/334* (2013.01); *B29C 2045/336* (2013.01); *B29L 2031/546* (2013.01)

(58) Field of Classification Search
CPC . B29C 45/332; B29C 45/4421; B29C 45/334; B29C 2045/336
(Continued)

(56) References Cited

U.S. PATENT DOCUMENTS 642,658 A * 2/1900 Whiton ............... B29C 45/4421
425/441
1,238,546 A * 8/1917 Manuel et al. ... B23B 31/16004
279/121
(Continued)

FOREIGN PATENT DOCUMENTS

CN 101508161 A 8/2009
CN 103072239 A * 5/2013 ........... B29C 45/332
(Continued)

OTHER PUBLICATIONS

Machine Translation CN103072239A (Year: 2013).*
(Continued)

*Primary Examiner* — Matthew J Daniels
*Assistant Examiner* — Wayne K. Swier
(74) *Attorney, Agent, or Firm* — CANTOR COLBURN LLP

(57) ABSTRACT

An injection mould having a first mould half (17) and a second mould half (18) which can be displaced relative to the first in a first direction (z). At least one of the mould halves has a slider arrangement (1) for forming a mould cavity (15). The slider arrangement (1) includes at least two sliders (2) which are moveable relative to one another between a closed and an open position and which are arranged so as to be displaceable with respect to a component (3), adjacent to the sliders (2), of the associated mould halves (17, 18) by means of first and second guide means (6, 7) respectively. A slider drive (4) is used to displace the sliders (2) between the open position and the closed position.

20 Claims, 5 Drawing Sheets

(58) Field of Classification Search
USPC .......................................................... 425/577
See application file for complete search history.

(56) References Cited

U.S. PATENT DOCUMENTS

| | | | | |
|---|---|---|---|---|
| 1,350,746 | A * | 8/1920 | Spillmann | B23B 31/16004 279/73 |
| 1,520,969 | A * | 12/1924 | Smart | B23B 31/16004 279/114 |
| 2,151,455 | A * | 3/1939 | Whiton | B23B 31/1602 279/114 |
| 3,266,100 | A * | 8/1966 | Belanger | B29C 45/4421 425/441 |
| 3,843,088 | A * | 10/1974 | McLoughlin | B29C 45/33 249/59 |
| 4,102,539 | A * | 7/1978 | Rohm | B23B 31/16079 279/114 |
| 4,889,480 | A * | 12/1989 | Nakamura | B29C 45/332 425/DIG. 58 |
| 5,494,434 | A | 2/1996 | Schwaiger et al. | |
| 6,093,015 | A * | 7/2000 | Navarre | B29C 45/332 264/318 |
| 6,397,712 | B1 * | 6/2002 | Rohm | B23B 31/16295 82/170 |
| 9,931,772 | B2 | 4/2018 | Armbruster | |
| 2002/0086074 | A1 * | 7/2002 | Lavallee | B29C 45/14073 425/116 |
| 2003/0054902 | A1 | 3/2003 | Masutani | |
| 2003/0067093 | A1 | 4/2003 | Brum | |
| 2008/0296802 | A1 | 12/2008 | Wachi | |
| 2016/0263786 | A1 | 9/2016 | Kong | |
| 2018/0001524 | A1 | 1/2018 | Matsuda | |
| 2018/0021999 | A1 | 1/2018 | Armbruster | |
| 2021/0046681 | A1 | 2/2021 | Armbruster | |

FOREIGN PATENT DOCUMENTS

| | | | |
|---|---|---|---|
| CN | 103072239 A | | 5/2013 |
| CN | 104875338 B | | 11/2017 |
| DE | 2 065 568 A1 | | 6/1974 |
| DE | 2065568 A * | | 6/1974 ............. B29C 45/33 |
| DE | 24 22 669 A1 | | 11/1975 |
| DE | 101 21 691 A1 | | 11/2002 |
| DE | 10 2005 017 222 A1 | | 10/2006 |
| EP | 0 070 189 A1 | | 1/1983 |
| EP | 1 035 959 A1 | | 9/2000 |
| EP | 1 155 802 A2 | | 11/2001 |
| EP | 1 174 242 A2 | | 1/2002 |
| EP | 1 428 645 A1 | | 6/2004 |
| EP | 1 725 386 A1 | | 11/2006 |
| EP | 1 782 936 A2 | | 5/2007 |
| EP | 2 883 675 A1 | | 6/2015 |
| GB | 2278801 A | | 12/1994 |
| JP | S6397181 A | | 4/1988 |
| JP | H0343224 A | | 2/1991 |
| JP | H 09131772 A | | 5/1997 |
| KR | 10-0844257 B1 | | 7/2008 |
| WO | WO 99/28108 | | 6/1999 |
| WO | WO 2005/077637 A1 | | 8/2005 |
| WO | WO 2007/082394 A1 | | 7/2007 |
| WO | WO 2007/085063 A1 | | 8/2007 |
| WO | WO 2013/001022 A1 | | 1/2013 |
| WO | WO 2015/158702 A1 | | 10/2015 |

OTHER PUBLICATIONS

Machine translation DE2065568A1 (Year: 1974).*
Machine translation JPH09131772A (Year: 1997).*
Machine translation KR100844257B1 (Year: 2008).*
Machine translation CN104875338A (Year: 2015).*
Chinese Patent Office (CNIPO), Beijing, P.R. China, First Office Action for Chinese Patent Application No. 201880087440.1, dated Aug. 3, 2021 (6 pages).
Chinese Patent Office (CNIPO), Beijing, P.R. China, Search Report for Chinese Patent Application No. 201880087440.1, dated Jul. 28, 2021 (2 pages).
EPO (Riswijk, NL), English language version of the International Search Report, Form PCT/ISA/210, for International Application PCT/EP2018/081606, dated Feb. 28, 2019 (2 pages).
European Patent Office, Communication, EPO Form 2001 11.16TRI, dated Nov. 11, 2022 (2 pages).
European Patent Office, EPO Form 2906 01.91TRI, European Office Action for European Patent Application No. 18 807 043.7, dated Nov. 11, 2022 (12 pages).
Stitz, Siegfried et al., Art. 115 EPU, Spritzgieß-technik, 6.6.2. 1"Aussenschieber" in Spritzgiesstechnik, Sep. 7, 2021, (pp. 426-427).

* cited by examiner

INJECTION MOULD FOR PRODUCING COMPLEX MOULDED PARTS FROM PLASTIC

BACKGROUND OF THE INVENTION

Field of the Invention

The present invention concerns the field of injection molds for producing parts by injection molding from plastic.

Discussion of Related Art

Injection molds for producing complex parts from plastic are known from the prior art. What is to be understood by complex parts are parts which, owing to their geometry, cannot be produced with normal molds and thus require injection molds having slides movable transversely to the general opening direction of the mold in order that they can be demolded at all. The reason lies in the fact that the parts have undercuts in the general demolding direction and can thus not readily be ejected. The slides of the conventional molds known from the prior art are as a rule coupled directly with the movement of the mold halves, with the result that it is only during opening, or closing, of the mold that the slides of the slide arrangement are moved. One disadvantage lies in the fact that, inter alia, time losses can occur during production as a result of this coupling.

DE 2065568 of Crouzet et Cie. was first published in 1970 and relates to a casting mold for producing cast workpieces, for example camlocks, which have projections extending on their outer side approximately perpendicularly to the workpiece longitudinal axis. The casting mold consists substantially of a pair of radially movable first sliding shoes which are arranged diametrally with respect to one another over a fixed base plate and are provided with an outer side which extends conically from top to bottom. The first sliding shoes serve to receive first mold parts which determine the mutual axial spacing of the projections, and of a pair of radially movable second sliding shoes which are arranged diametrally with respect to one another and which are provided with an outer side which extends conically from top to bottom and which are arranged in the plane of the pair of first sliding shoes in an offset manner thereto and are intended for receiving second mold parts which determine the radial extent of the projections, and of a head part which, in the closed state of the mold, is arranged on the sliding shoes and, upon opening of the mold, moves axially away from the sliding shoes.

DE 2422669 of INA Wälzlager Schäffler K G was first published in 1975 and relates to a device for producing radial rolling bearing cages from plastic, in which two annular flanges are connected to one another by means of webs distributed over the circumference. The injection mold comprises a cylindrical core corresponding to the cage inside diameter, and a mold outer part having radially movable slides. The injection mold has cutouts for simultaneously producing two cages, which cutouts are arranged coaxially behind one another and at a distance from one another. The boundaries for the mutually facing end faces of the annular flanges are formed by the slides.

CN 101508161 A of Ninghai Deke Mould Co. Ltd. was first published in 2009 and relates to a slide arrangement which has a plurality of radially adjustable slides. The slides are driven by means of a plate which is arranged so as to be rotatable about an axis and which has spirally arranged slots in which there are engaged pins which are mounted on the radially displaceable slides. The plate is driven by means of a comparatively steep thread, which requires a considerable overall height. The slides are arranged comparatively far from the rotatable plate, resulting in the pins having to bridge this distance. This leads to an unfavorable profile of the forces.

SUMMARY OF THE INVENTION

An object of the invention consists in demonstrating an injection mold having a slide arrangement that has a small overall height and allows robust construction of the slide arrangement, and in principle allows a plurality of planes for producing complex parts.

An injection mold according to the invention has as a rule a first mold half and a second mold half which is displaceable relative to the first in a first direction, wherein at least one of the mold halves comprises a slide arrangement for forming a mold cavity which serves to mold a complex part from plastic by injecting plasticized plastic into said mold cavity and then curing it. Depending on the geometry of the part to be produced, the slide arrangement has at least two slides which are movable relative to one another between a closed position and an open position and which, by way of respective first and second guide means, are arranged so as to be displaceable with respect to a component, which is adjacent to the slides, of the associated mold half. The slides are as a rule arranged radially with respect to an axis. However, depending on the configuration, they can also be arranged laterally offset to said axis such that the vectors of the movements of the individual slides do not run through a common center. Furthermore, a drive for the slides (slide drive) is provided which is preferably based on third and fourth guide means which are operatively connected to one another and serve to displace the slides between the open and the closed position. The drive advantageously occurs independently of the position of the mold halves of the injection mold and, by contrast with the prior art, is thus decoupled from the movement of the injection mold. The third and the fourth guide means of the slide drive advantageously bear against the component of the mold half such that the spacings and occurring forces can be kept as low as possible and the construction can be kept compact. The slide drive can be designed to be self-locking such that the slides cannot be moved unintentionally. The component of the mold half that serves for mounting the slides can at least partially enclose the slides or bear against them along one or more surfaces.

In a particularly compact variant, the first guide means have a first groove, and the second guide means have an upper part, which is arranged in the first groove, of a sliding block. The third guide means are formed by a second groove, and the fourth guide means are formed by a lower part of the sliding block that is arranged in the second groove. The groove of the third guide means are arranged on and/or in a disk which is rotatable about an axis of rotation and which can also be configured as a ring. The disk is preferably arranged in one plane and has on its circumference a toothing via which, for rotation about the axis of rotation, it can be driven for example via a rack integrated in the mold half. The very compact design form makes it possible in a simple manner for a plurality of slide arrangements to be arranged laterally next to one another or in a grid with respect to one another.

The first and the third guide means can be arranged at an angle to one another which is constant and/or varies over the profile such that, upon rotation of the disk about the axis of rotation, a displacement of the associated slides between an open or a closed position is brought about. Depending on the application field, the slides can be arranged with respect to one another in one plane and/or at an angle to one plane. There also exists the possibility, as is shown in the exemplary embodiments, of arranging slides on a plurality of levels which are driven individually or jointly. The slides of the slide arrangement can serve for example to form a spherical mold cavity by means of which spherical objects, for example golf balls and the like, can be efficiently produced. It is possible by means of differently driven slides for multilayer objects to be produced by certain slides standing still in a targeted manner and thus be able to serve to free up a region for a further material component. The arrangement of the slides also allows depressions to be produced on the surfaces that under normal circumstances lead to undercuts and thus cannot be demolded. Here, too, golf balls are mentioned as an example which, for aerodynamic reasons, can have dimples on the surface which cannot be produced by means of conventional injection molds since they cannot readily be demolded.

Two adjacent slides of the slide arrangement normally interact via one or more sealing surfaces. Alternatively or in addition, the slides can be supported on one another in the closed position via the sealing surfaces. The sealing surfaces can be planar and/or three-dimensionally curved. The sealing surfaces are advantageously situated in a plane of symmetry between two mutually assigned slides. The slides can have as required a holding-shut surface which opposes the opening direction of the slides and, in the closed position of the injection mold, interacts with a correspondingly arranged counter-surface such that the slides are locked against the injection pressure acting during injection molding within the mold cavity. This also ensures that the slide drive can be relieved of negative forces. The counter-surface is advantageously arranged on the other mold half of the injection mold such that the operative connection is produced in the closed position. Alternatively or additionally, the counter-surface can also be arranged on the rotatable disk such that, when the latter reaches a defined position, the counter-surface presses against the holding-shut surface and the slides are thus held in the closed position. The counter-surfaces can interact directly or indirectly with the holding-shut surfaces. The counter-surfaces can be arranged for example on a projecting region of the disk or a part operatively connected thereto. Depending on the application field, at least one mold core is present which, in the closed position of the injection mold, forms part of the outer wall of the mold cavity between the slides. That part of the outer wall of the mold cavity which is formed by the mold core can be convex or concave in form, that is to say can project into the mold cavity or be situated outside the latter in the closed position. The mold core can correspond with the mold cavity through an opening in a component of the mold half. As required, the two mold halves can have a slide arrangement, wherein the slides interact directly to form the mold cavity in the closed position of the injection mold.

BRIEF DESCRIPTION OF SEVERAL VIEWS OF THE DRAWINGS

Aspects of the invention will be explained in more detail on the basis of the exemplary embodiments shown in the following figures and on the basis of the associated description. In the figures.

DETAILED DESCRIPTION OF THE INVENTION

Figure 1:
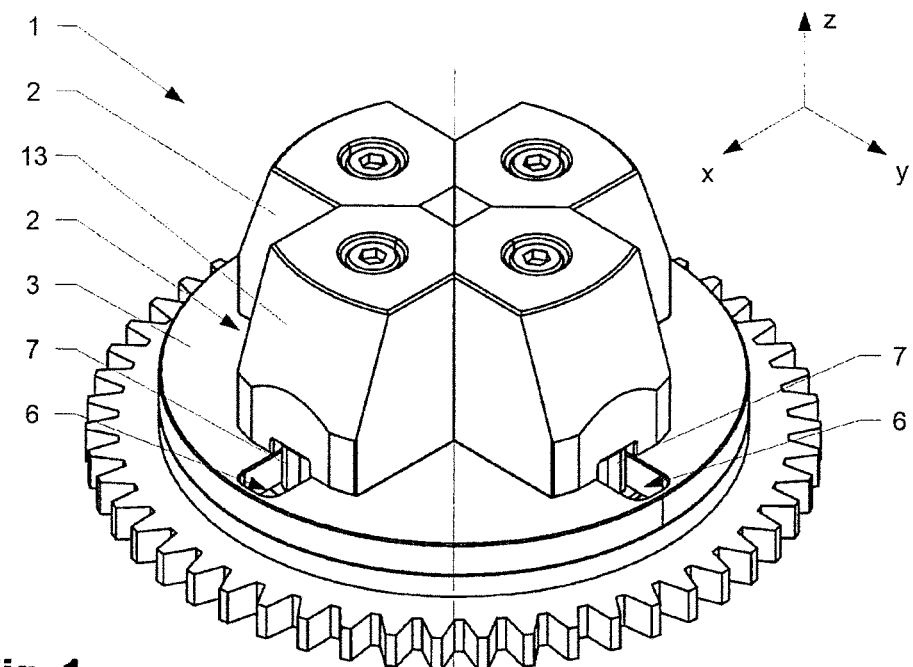
FIG. 1 shows a slide arrangement in a perspective illustration obliquely from above and from the front in a closed illustration.
Figure 2:
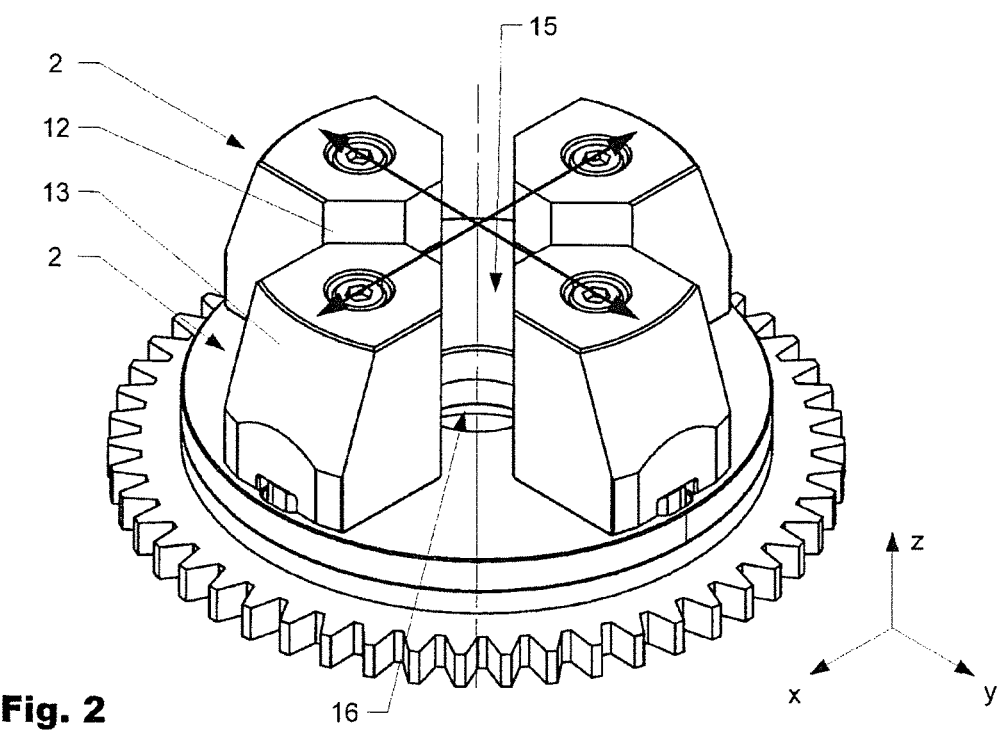
FIG. 2 shows the slide arrangement according to FIG. 1 in the open state.
Figure 3:
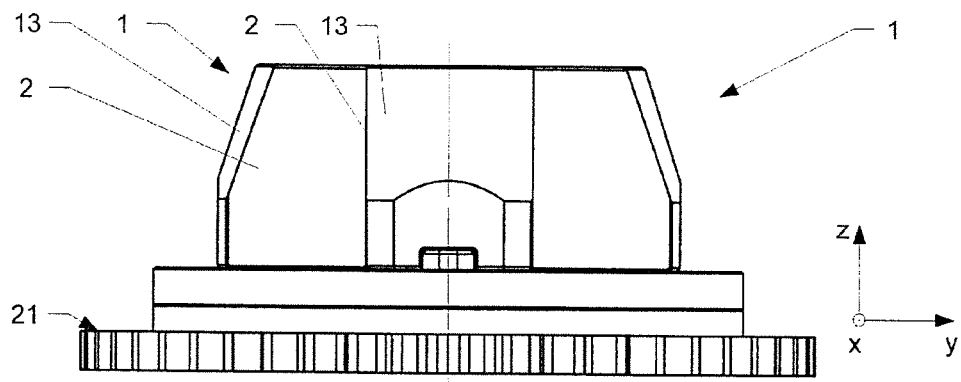
FIG. 3 shows the slide arrangement according to FIG. 1 in a side view.
Figure 4:
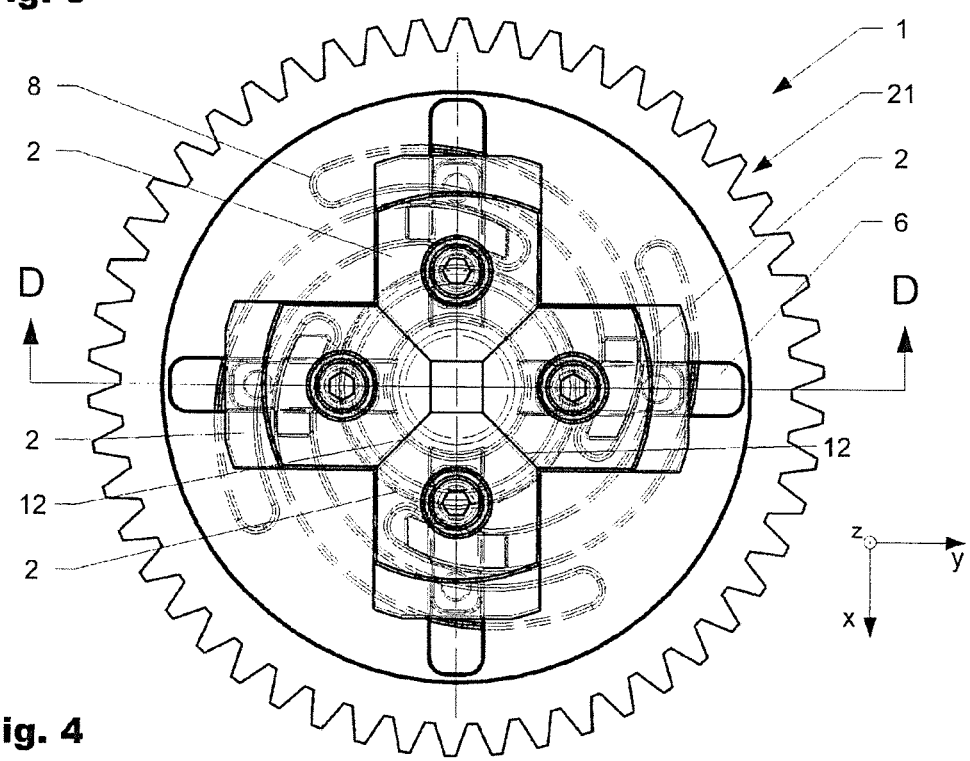
FIG. 4 shows the slide arrangement according to FIG. 1 in a plan view.
Figure 5:
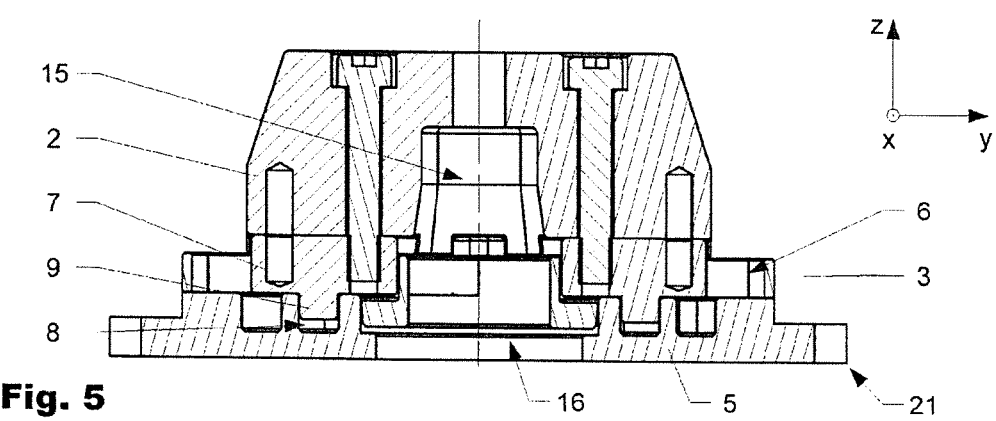
FIG. 5 shows a sectional illustration through the slide arrangement according to FIG. 4.
Figure 6:
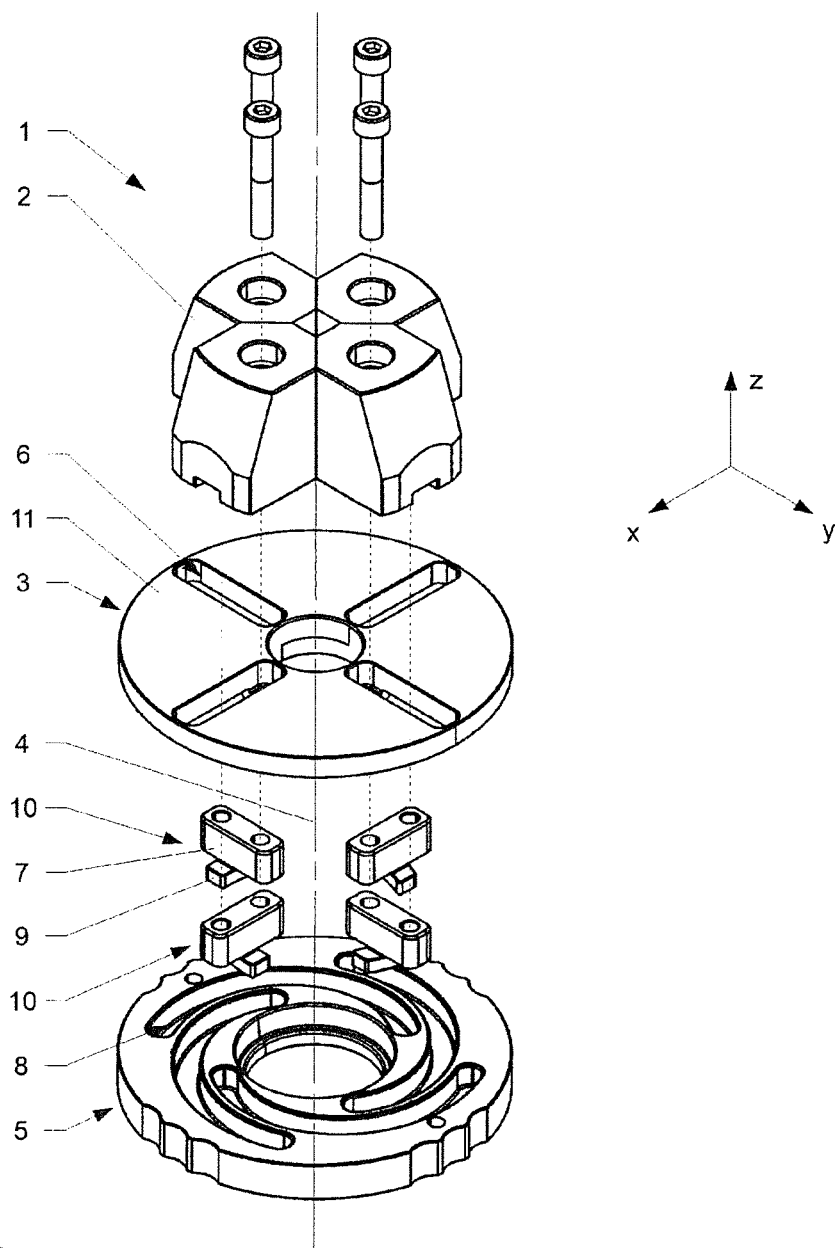
FIG. 6 shows the slide arrangement according to FIG. 1 in an exploded illustration.

FIG. 1 shows a first variant of a slide arrangement 1 in a perspective illustration obliquely from above and from the front in a closed position. FIG. 2 shows the slide arrangement 1 according to FIG. 1 in an open position. FIG. 3 shows the slide arrangement 1 in a side view, and FIG. 4 is a view from above with the nonvisible edges being illustrated as dashed lines. FIG. 5 shows the slide arrangement 1 in a sectional illustration along the section line DD according to FIG. 4. FIG. 6 shows the slide arrangement 1 in an exploded illustration.

Figure 7:
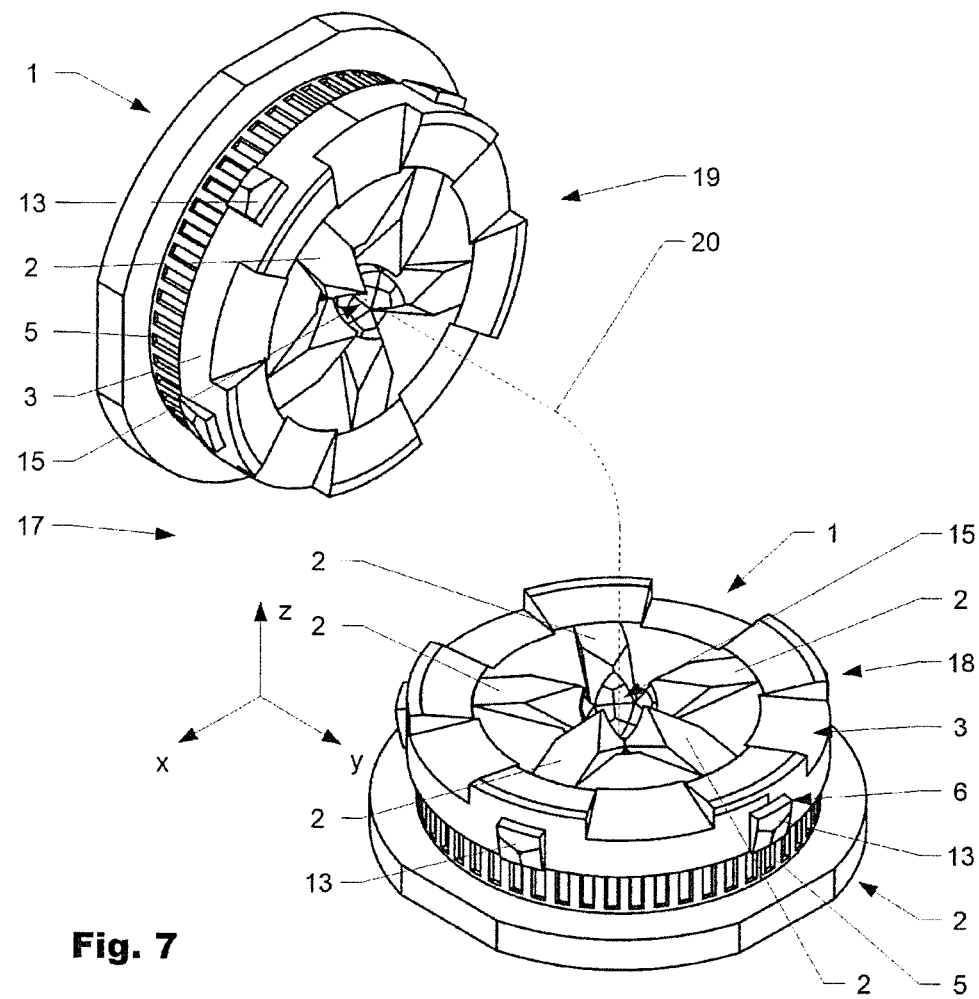
FIG. 7 shows a second embodiment of a slide arrangement in a perspective illustration obliquely from above and from the front.
Figure 8:
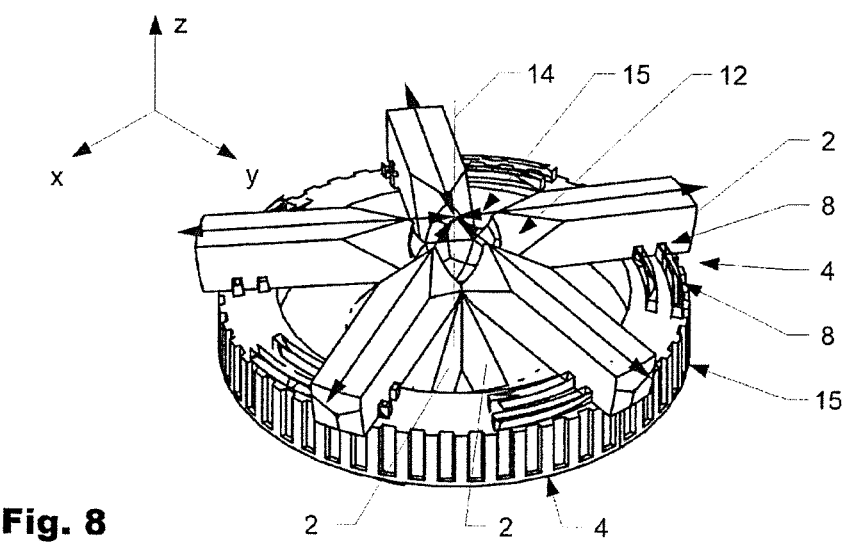
FIG. 8 shows a side of the slide arrangement according to FIG. 7 without fixed parts.
Figure 9:
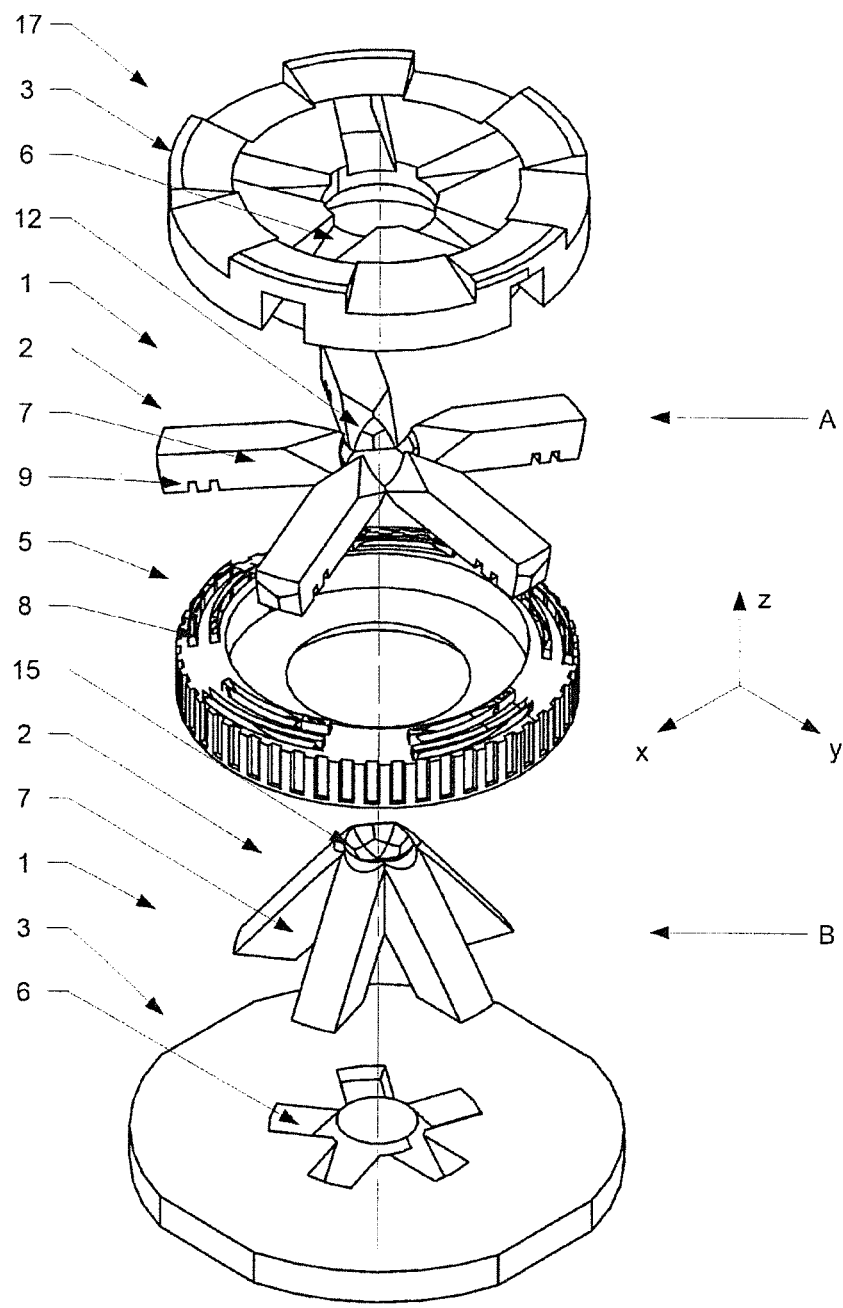
FIG. 9 shows the slide arrangement according to FIG. 8 in an exploded illustration.

FIG. 7 shows a variant of a slide arrangement 1 in a perspective illustration. FIG. 8 shows parts of a slide arrangement 1 according to FIG. 7 obliquely from above and from the front. FIG. 9 shows a side of the slide arrangement according to FIG. 7 in an exploded illustration obliquely from above and from the front.

The slide arrangement 1 is as a rule installed in an injection mold and visible from outside only to a limited degree if at all. The injection mold and its further components are not illustrated in detail. The injection mold has a first mold half and a second mold half which is displaceable relative thereto, said mold halves being installed to produce parts in an injection molding machine (likewise not shown). With reference to the slide arrangement 1 shown in the figures the first and the second mold half are moved in the direction of the z axis (first direction) of the coordinate systems of the slide arrangement 1. This direction corresponds to the opening or closing direction of the injection mold or to the general demolding direction of the parts produced by means of the injection mold.

The slide arrangement 1 serves for the efficient production of complex parts from injection-molded plastic and the like. By contrast with the prior art, the slide arrangement 1 has a very small space requirement, or a very small overall height. Furthermore, the slide arrangement 1 allows the simultaneous or time-staggered control of a plurality of slides 2 which as required can also be arranged in a plurality of planes, parallel in one plane or spatially at an angle to one another.

The slides 2 of the slide arrangement 1 are mounted so as to be displaceable with respect to a component 3 of the mold half by way of first and second guide means 6, 7. As shown in FIGS. 1 to 6, the component 3 of the mold half can have the form of a plate and/or the slides 2 can be, for example, integrated in a mold plate and at least partially completely enclose the latter (cf. FIGS. 7 to 9). Depending on the application field, the component 3 can consist of one part or be of multipart design.

The slides 2 are moved back and forth between an open and a closed position by means of a slide drive 4. As can be seen in FIG. 6, the slide arrangement 1 has, in addition to the slides 2 and the component 3, which serves for mounting the slides 2, a disk 5 which is rotatable about an axis 14 (z direction). The slide 5 has a plurality of third guide means 8 which, in the embodiment shown, are incorporated in the form of grooves 8 in a surface. Fourth guide means 9 engage in the grooves 8 in the mounted state.

From the view of the observer, the slides 2 are arranged above the plate 3 and mounted so as to be displaceable, here radially, with respect to the latter by means of the first and the second guide means 6, 7 (other directions which for example do not run through the center, or are offset to one another, are possible). In the variant shown, the first guide means 6 are radially extending grooves 6. For each slide 2, an upper part 7, which is operatively connected thereto, of a specially shaped, double-acting sliding block 10 are arranged so as to be displaceable in said grooves 6 in the direction thereof. These upper parts 7 protrude through an assigned groove 6 in the vertical direction and lead at their lower end into a lower part 9 of the sliding block 10. The lower parts 9 of the sliding blocks 10 are each arranged in a spiral groove 8 of a disk 5 so as to be displaceable therein in the circumferential direction along the course of the groove 8 while the disk 5 is rotated with respect to the plate 3 about an axis of rotation 14. The upper parts 7 and lower parts 9 of the sliding blocks 10 are advantageously manufactured in one piece. Depending on the application field, other, also multipart, configurations are possible. As can be seen in the exploded illustration according to FIG. 6, the upper part 7 and the lower part 9 of a sliding block 10 are arranged substantially at right angles and are adapted to the shape of the movement to be carried out. In the movement direction, they have an elongate configuration which produces an increase in the contact surface and thus a better distribution of the forces.

Depending on which requirements are set by the geometry of the part to be produced, the slides can also be arranged to extend along a straight line which does not run through a center. What is to be understood by center here is a point in which the movement directions of the slides meet. The concept according to the invention allows variants which have a nonrectilinear movement profile by virtue of the guide means being correspondingly configured.

The slides 2 are configured in such a way that, in the closed state, they form at least one part of a mold cavity 15 which serves for molding a part from plastic by plasticized plastic being injected into said cavity and then cured. The mold cavity 15 as a rule has, below and/or above, an opening 16 between the slides 2 which, in the closed position of the injection mold, serves to receive and enclose a mold core (not shown in further detail) which is likewise a component of the mold cavity and forms an inner and/or outer contour of the part to be produced. Upon opening of the slides 2, the mold core can serve to hold the part produced between the slides.

In the closed position in each case two slides 2 interact along at least one sealing surface 12, as a rule in a laterally sealing manner. The slides 2 can, as required, have a holding-shut surface 13 which, in the closed position of the injection mold, relieves the slide drive 4 from the injection pressure acting in the mold cavity. In the arrangement shown, the holding-shut surfaces 13 are arranged on the rear side of the slides 2 and inclined with respect to the aforementioned closing direction (z direction) of the injection mold. The injection mold has a counter-surface which is formed in a corresponding manner to the closing surface and which is arranged on the opposite mold half and, in the closed position of the injection mold, presses from behind in the closing direction onto the holding-shut surfaces 13 of the slides 2 in a controlled manner such that the latter rest on one another at least via the sealing surfaces 12.

FIG. 7 schematically shows a first mold half 18 and a second mold half 19 which is displaceable relative to the first in a first direction (z axis) (schematically illustrated by a dashed line 20). In order for the interior of the second mold half 19 to be visible, the latter is illustrated as being tilted through 90°. In the variant shown, the two mold halves 18, 19 are of identical design and each have a slide arrangement 1 for forming a, here spherical, mold cavity 15 which, as for example in the case of the surface of a golf ball, can have undercuts (not shown in further detail) which can be demolded by means of the slides 2. Other geometries are of course possible. In the variant shown, the slides 2 of the two mold halves 18, 19 directly interact in the closed position of the injection mold 17. Each mold half 18, 19 has a plurality of slides 2 which are movable relative to one another between a closed position and an open position and which, by way of respective first and second guide means 6, 7, is arranged so as to be displaceable with respect to a component 3, which is adjacent to the slides 2, of the associated mold half 17, 18.

As can be seen in FIGS. 8 and 9, the slides 2 are via a slide drive 4 with third and fourth guide means 8, 9 which are operatively connected to one another and serve to displace the slides 2 between the open and the closed position. As can be seen, the third and the fourth guide means 8, 9 of the slide drive 4 bear against the component 3 of the mold half. In the variant shown, the component 3 of the mold half at least partially encloses the slides 2. By contrast thereto, in the first variant according to FIGS. 1 to 6, it bears against them only laterally. Here, the first guide means are, for each slide 2, an opening 6 in the component 3 of the mold half. The second guide means is formed by the slide 2 itself which is arranged in the opening and is guided through its inner walls (not shown in further detail). The third guide means are formed by a comb 8, and the fourth guide means are formed by a groove 9 in the slide 2. As can be seen, the third guide means 8 are arranged on the disk 5 which is rotatable about the axis of rotation 14. In the variant shown, the disk 5 is of annular configuration and has, both at the bottom and at the top, third guide means 8 which serve for driving the slides 2 arranged on two levels. The first and the third guide means 6, 8 are arranged at an angle to one another such that, upon rotation of the disk about the axis of rotation 14, a displacement of the associated slides 2 between an open or a closed position is brought about. In each case two slides 2 interact in the closed position via sealing surfaces 12. This applies both to adjacent slides 2 of a mold half 18, 19 (for each level and also over a plurality of levels) and to mutually assigned slides 2 of the first and the second mold half 18, 19.

The slides 2 can have a holding-shut surface 13 which, in the closed position of the injection mold, interacts with a correspondingly arranged counter-surface of the other mold half of the injection mold such that the slides 2 are locked in the closed position against injection pressure acting within the mold cavity 15. By contrast with the first variant, no mold core is present here which, in the closed position of the injection mold, forms part of the outer wall of the mold cavity 15 between the slides 2. The entire mold cavity 15 is formed by the slides 2.

FIG. 9 schematically shows a mold half 18, 19 of the injection mold 17 according to FIG. 7 in an exploded illustration exploded with respect to the z axis. There can be seen the slides 2 which are arranged here in two groups on two levels A, B. The slides 2 serve to form a spherical mold cavity 15 in the closed position of the injection mold. Differently configured mold cavities are possible. The slides 2 are driven via the, here annular, disk 5 via the third and the fourth guide means 8, 9. The slides 2 are mounted so as to be linearly displaceable in grooves, or openings 6, of the components 3 of the mold half. In the embodiment shown, they are oriented radially with respect to the axis of rotation 14 in the horizontal direction (x, y plane). In the vertical direction (z axis), they are arranged at an angle to the axis of rotation 14.

The invention claimed is:

1. An injection mold comprising:
   a first mold half and a second mold half which is displaceable relative to the first mold half in a first direction (z), wherein at least one of the mold halves has a slide arrangement having several slides for forming a mold cavity, having
   at least two slides which are movable relative to one another between a closed position and an open position and which, by way of respective first and second guide means are arranged so as to be displaceable with respect to a component, adjacent to the slides, of the associated mold half, and
   a slide drive having one set of third and fourth guide means dedicated, respectively, to each slide of the several slides, which third and fourth guide means are operatively connected to one another and to only their respective slide, and which serve to displace their respective slide between the open and the closed position, wherein
   each slide has a holding-shut surface which is arranged opposing to an opening direction of the slides and, in the closed position of the injection mold, interacts with a correspondingly arranged counter-surface arranged at an opposite mold half of the injection mold in an opposite direction, such that the slides are locked in a direction opposite to a closing direction against the injection pressure acting during injection in the mold cavity upon each slide within the mold cavity such that the slide drive is relieved of negative forces resulting from the pressure in the mold cavity during injection, and
   wherein each slide is operatively coupled to its respective first, second, third, and fourth guide means in a substantially identical manner.

2. The injection mold as claimed in claim 1, wherein the third and fourth guide means of the slide drive bear against the component of the associated mold half.

3. The injection mold as claimed in claim 1, wherein the component of the mold half at least partially encloses the slides or bears against them along a surface.

4. The injection mold as claimed in claim 1, wherein
   the first guide means has a first groove, and the second guide means has an upper part, that is arranged in the first groove of a sliding block, and
   the third guide means has a second groove, and the fourth guide means has a lower part of the sliding block,
   wherein the third guide means are arranged on and/or in a disk arranged to be rotated about an axis of rotation, and
   the first and the third guide means are arranged at an angle to one another such that, upon rotation of the disk about the axis of rotation, a displacement of the associated slides between an open or a closed position is brought about.

5. The injection mold as claimed in claim 1, wherein the slides are arranged with respect to one another in one plane and/or at an angle to one plane.

6. The injection mold as claimed in claim 1, wherein the slides form a spherical mold cavity.

7. The injection mold as claimed in claim 6, wherein the slides form a spherical mold cavity with local undercuts.

8. The injection mold as claimed in claim 1, wherein in each case two slides interact in the closed position via a sealing surface.

9. The injection mold as claimed in claim 1, wherein at least one mold core is present which, in the closed position of the injection mold, forms part of the outer wall of the mold cavity between the slides.

10. The injection mold as claimed in claim 9, wherein the mold corresponds with the mold cavity through an opening in the component of the mold half.

11. The injection mold as claimed in claim 1, wherein the two mold halves have a slide arrangement, wherein the slides directly interact in the closed position of the injection mold.

12. The injection mold as claimed in claim 1, wherein
    the first guide means has a first groove and the second guide means has an upper part that is arranged in the first groove of a sliding block, and
    the third guide means has a second groove and the fourth guide means has a lower part of the sliding block, wherein the third guide means are arranged on and/or in a disk arranged to be rotated about an axis of rotation, and
    the slides form a spherical mold cavity with local undercuts.

13. The injection mold as claimed in claim 1, wherein the several slides of the slide arrangement are arranged in a first plane, and wherein each of the each first, second, third, and fourth guide means are in one or more different planes that do not overlap with the first plane.

14. An injection molding method, comprising:
    forming a mold cavity by advancing a first mold half relative to a second mold half along an axis (z) in a first direction, wherein at least one of the mold halves has a slide arrangement having several slides;
    during the forming, moving the several slides relative to one another between an open position and a closed position by way of respective first and second guide means that are arranged to be displaceable with respect to a component, adjacent to the slides, of the associated mold half;
    further during the forming, operatively connecting third and fourth guide means to one another, wherein a single set of third and fourth guide means is dedicated to each slide of the several slides and wherein the operatively connecting the third and fourth guide means serves to displace their respective slide between the open position and the closed position, wherein each slide is operatively coupled to its respective first, second, third, and fourth guide means in a substantially identical manner; and opening the mold cavity by withdrawing the first mold half relative to the second mold half along the axis (z) in a second direction, the second direction being opposite the first direction, wherein the opening further includes moving the at least two of the several slides relative to one another between the closed position and the open position and operatively reversing the third and fourth guide means from one another to displace their respective slide between the closed position and the open position.

15. The injection molding method of claim 14, comprising:
further during the forming, causing a holding-shut surface of each slide to interact with a correspondingly arranged counter-surface arranged at an opposite mold half of the injection mold in an opposite direction such that the several slides are locked in a direction opposite to a closing direction against an injection pressure acting during injection in the mold cavity upon each slide within the mold cavity such that a slide drive is relieved of negative forces resulting from the pressure in the mold cavity during injection.

16. The injection molding method of claim 14, wherein forming the mold cavity includes forming a spherical mold cavity with local undercuts.

17. The injection molding method of claim 14, comprising:
further during the forming, causing a holding-shut surface of each slide to interact with a correspondingly arranged counter-surface arranged on a rotatable disk such that, when the rotatable disk reaches a defined position, each correspondingly arranged counter-surface aligns against its respective holding-shut surface and the slides are thus held in the closed position against an injection pressure acting during injection in the mold cavity upon each slide within the mold cavity.

18. A slide arrangement for forming a complex product during injection molding, comprising:
a plurality of slides couplable to a portion of a mold, the several slides arranged to move between an open position and a closed position, the plurality of slides cooperating to form a mold cavity in the closed position;
a plurality of sets of first and second guide means, each set of first and second guide means dedicated to one of the plurality of slides, the plurality of sets of first and second guide means being displaceable with respect to a component to guide the plurality of slides between the open and closed positions;
a slide drive having a plurality of sets of third and fourth guide means, each set of third and fourth guide means dedicated to one of the plurality of slides, the third and fourth guide means of each of the plurality of sets of third and fourth guide means being operatively connected to one another and to only their respective slide, and the third and fourth guide means of each of the plurality of sets of third and fourth guide means arranged to displace their respective slide between the open and the closed position, wherein each slide is operatively coupled to its respective first, second, third, and fourth guide means in a substantially identical manner.

19. The slide arrangement of claim 18, wherein the mold cavity is a spherical mold cavity.

20. The slide arrangement of claim 18, wherein the mold cavity is a spherical mold cavity with local undercuts.

* * * * *